Patented July 11, 1950

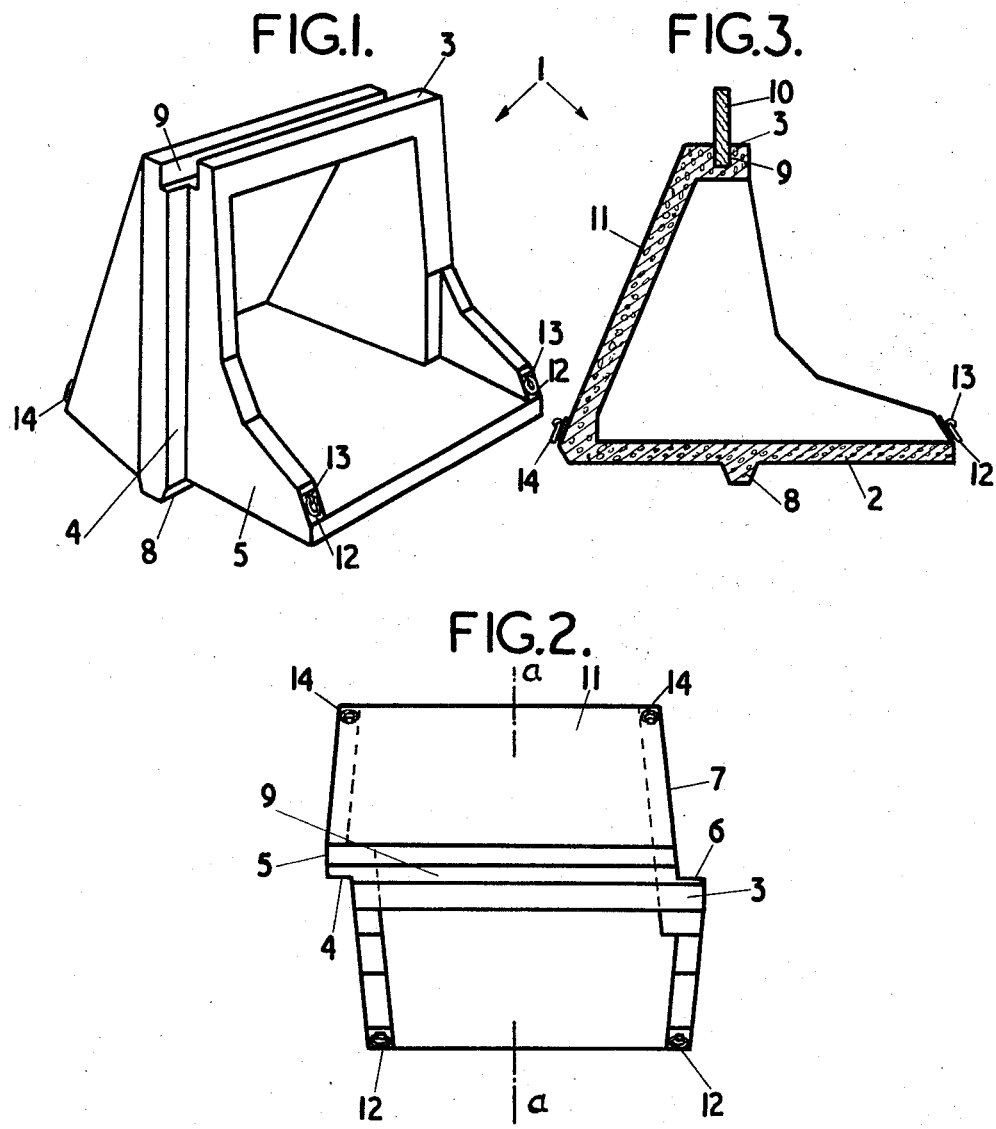

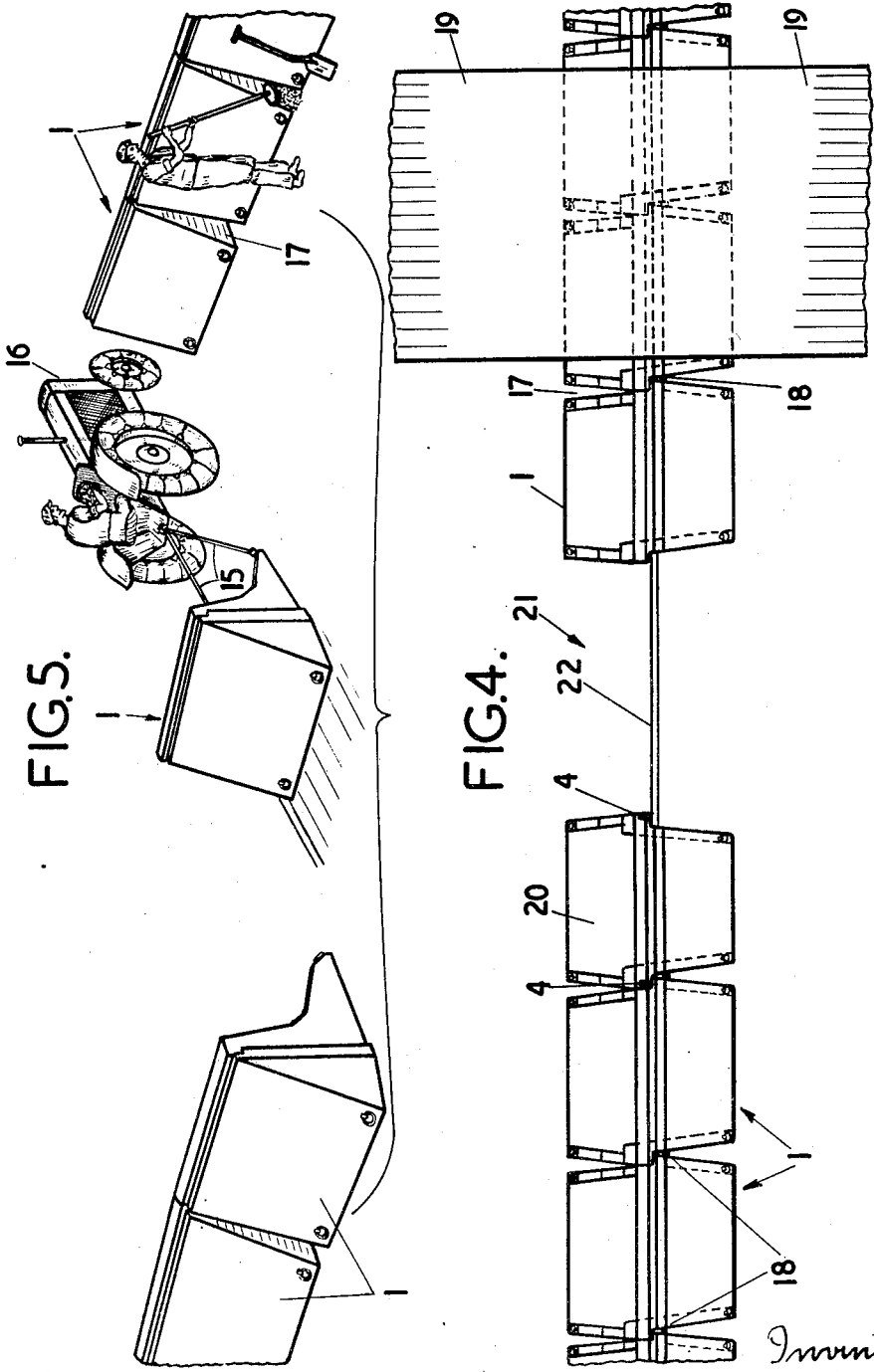

2,515,059

UNITED STATES PATENT OFFICE 2,515,059

FLOOD BANK AND SIMILAR STRUCTURE AND UNITS FOR USE IN THE ERECTION OF SUCH STRUCTURES

Frederick William Rowbotham, Stonehouse, England

Application July 15, 1946, Serial No. 683,619
In Great Britain July 17, 1945

5 Claims. (Cl. 61—4)

1

This invention has reference to flood banks and similar structures and to units for use in the erection of such structures.

One object of the invention is to provide a bank-like structure, for containing flood water, for confining water within predetermined areas, or for other purposes, which structure can be erected easily and quickly.

Heretofore, such a bank has been erected from earth or other loose spoil obtained from one or more borrow-pits located at a distance from the site where the bank is to be erected. Such earth or like banks have the disadvantage that, for a given size of bank, a far greater bulk of spoil has to be transported to the site; that the loose spoil has to be allowed to consolidate or settle over a considerable period of time; that the bank has to be covered with turf to prevent or minimise the surface material from being washed away or otherwise displaced due to causes which cannot be controlled; that until the material has consolidated and the turf has become established, it is necessary to fence off the bank to prevent cattle having access thereto; that considerable expense has to be incurred in maintaining the bank in good condition (for example grass, noxious weeds and briars must be cut periodically, and loss in height due to natural subsidence and various other causes must be made good); and that the bank is liable to suffer from damage by rabbits, moles and other vermin. The invention aims at overcoming all these known disadvantages.

A further object of the invention is to provide a bank which, as and when required (for example due to the erosion of land by sea or river water), is adapted to be transferred to a fresh site without difficulty, with a minimum of labour, and at a minimum cost.

Still another object of the invention is to provide bank units capable of being produced, transported and erected, in a water proof manner, in a minimum of time, with a minimum of labour, and at a minimum expense.

These and other objects and advantages of the invention will become apparent to those skilled in the art upon reference to the accompanying specification, claims and drawings.

In the said drawings:

Figure 1 is a rear perspective view of a unit for use in the erection of a bank.

Figure 2 is a plan of the unit shown in Figure 1.

Figure 3 is a section along the line a—a, Figure 2 and showing a board or slab in the groove

2 along the top edge of the unit to increase the effective height thereof.

Figure 4 is a plan of a portion of a bank erected from the units shown in Figures 1–3, and Figure 5 is a perspective view showing a bank in course of transfer from one site to another.

Each bank unit 1, as shown in Figures 1–3 of the said drawings, is moulded of concrete or similar substance, and comprises a base 2 which is of substantial width from the back to the front of the unit in comparison with the width of the crown 3. A shoulder 4 is formed on one lateral face 5 of the unit and a shoulder 6 is formed on the other lateral face 7; the shoulder 4 being directed rearwardly and the shoulder 6 being directed forwardly of the unit, and both shoulders extending from the base 2 to the crown 3 at right angles to the said base.

A sealing bar or keel 8 extends transversely of the base 2 between the shoulders 4 and 6, the said bar or keel being integral with the unit and being tapered towards its lower end to facilitate it becoming bedded automatically into the ground on the erection site solely under the weight of the unit when the ground is sufficiently soft.

A transverse groove 9 is formed transversely of the crown 3, and a board or slab 10 may be inserted edgewise into the said groove for imparting additional effective height to the unit.

The front 11 of the unit is inclined upwardly and rearwardly from the base 2 to the crown 3, whereas the sides 5 and 7 are at right angles to the base. The rear edges of the sides 5 and 7 extend from the rear edge of the relatively narrow crown to the rear edge of the base and at or near the base, each of the said rear edges is provided with a swivelled ring 12. The rings 12 are securely anchored to the sides of the unit in any desired manner, such as by eyed rag-bolts 13. Similar rings 14 are provided at either side and at or towards the lower edge of the front 11 of the unit.

The arrangement of the front, sides, crown and base is such that a backless hollow unit is provided. Consequently, if necessary or desired, any form of ballast, such as solid stone or concrete blocks, may be placed within the unit to increase the total dead weight and therefore decrease the possibility of a unit being displaced should the height of the water retained by the front of the unit rise to the vicinity of the crown 3 or the upper edge of the board 10. Further, the construction of the unit is such that, with the exception of the groove 9, the formation of pockets or recesses, in which water could collect and freeze and thereby damage the structure, is avoided.

To erect a flood or other bank, the desired number of units are placed side-by-side in a continuous row with the shoulder 4 of each unit, with the exception of the unit at the left hand end of the bank, arranged in overlapping abutment with the shoulder 6 of the next adjacent unit.

The units may be dragged into position by coupling one end of each of two chains 15 or the like to the front rings 14, or rear rings 13, and the other ends of the said chains or the like to a tractor 16. The location of the said rings at or adjacent the base 2 ensures that, when each unit is dragged into position, its edge adjacent the tractor is raised from the ground so that a clearance is provided between the ground and the bar or keel 8 and also, so that as the unit reaches its preselected position and the drag is removed from the rings, the base may be lowered suddenly and rapidly flat on to the ground thereby ensuring (when the ground is soft) that the said keel embeds itself in the ground. Preferably however, the units are taken into position by a crane or like lifting machine which is adapted to lift, by chains or the like coupled to the front and rear rings 13, 14, the units from the ground entirely and to drop them into their preselected positions.

If the bank is to be erected on hard ground into which the keels 8 cannot become embedded when lowered into position by either of the above methods, a keel-receiving channel may be dug, or otherwise formed, in the ground prior to the erection of the bank.

When a row of units are arranged with their shoulders 4 and 6 in abutting contact, the keels 8 are located in end to end alignment in the form of a continuous ridge and form an effective water seal below the bank.

As will be seen from the drawings, the sides 5 and 7 of each unit are, forwardly and rearwardly of the crown 3, inclined inwardly towards one another; hence, a mouth or gap 17 is formed between adjacent units fore and aft of the bank, and earth may be rammed into these gaps, more particularly in the gaps between the water-retaining front faces of the units, to enhance the water-tightness of the bank. Also lengths 18 of rope, rubber hose or like resilient material, may be inserted in the angle formed by the inclined sides of the unit forwardly of the crowns 3, for the same purpose. Finally, and with the object of enhancing the water seal below the bank, earth and/or turf may be turned up along the front toe or forward edge of the bank.

When the units are in position to form a continuous unbroken and waterproof bank, the grooves 9 are also arranged in continuous and unbroken alignment as are the keels 8. Therefore, when it is desired to increase the effective height of the bank by means of the boards or slabs 10, the latter may be of a length such that each extends across more than one unit.

To facilitate access from one side to the other of a complete bank, earth ramps 19 may be built up at selected positions along the bank. Alternatively, by providing one of the units 20 with forwardly facing shoulders 4 on both sides thereof, a space 21 may be left between the unit 20 and the right hand adjacent unit 1 and into which space boards 22 could be fitted as and when required, namely, during periods of flood or high tides, said space boards 22 being retained in vertical position against said forwardly facing shoulders by any suitable means (not shown) and being readily removable from said position when desired.

As will be seen, more particularly from Figure 5, when a bank has been erected, and even after a considerable time has elapsed since erection was completed, it can readily and quickly be dismantled and re-erected. Thus if it is desired to transfer the bank to a site behind its original site, the unit on the right hand end of the bank can be dragged or lifted backwards since the overlapping abutment of the shoulders 4 and 6 is such that there is nothing to prevent rearwards movement of the right hand unit by a tractor or crane. Similarly, if the bank is to be re-erected on a site in front of its original site, the left hand unit 1 is removed first and the units are moved successively along the length of the bank.

The above specifically described embodiments of the invention should be considered as illustrative only, as, obviously, many changes may be made therein without departing from the spirit or scope of the invention. Reference should therefore be made to the appended claims in determining the scope of the invention.

Having described my invention what I claim and desire to secure by Letters Patent is:

1. A prefabricated unit for use in the erection of banks, said unit having a front, upstanding, spaced side walls, a crown, and a base having front and rear edges, and having a vertical shoulder on the exterior of each of said side walls and extending from the crown to the base of said unit, one shoulder being arranged to face toward the front, and the other shoulder being arranged to face toward the rear, of the unit, the side walls fore and aft of said vertical shoulders being inclined inwardly of the unit toward the front and rear edges, respectively, of said base.

2. A prefabricated unit for use in the erection of banks as defined in claim 1, in which the vertical shoulders at opposite sides of the unit are disposed in the same vertical plane, and in which a keel extends transversely of the underside of the base and is disposed in the same vertical plane which includes said shoulders.

3. A bank erected from a plurality of prefabricated units located side-by-side in horizontal alinement, each unit including a front, spaced, upright side walls, a crown, and a base having front and rear edges, each of said side walls having a vertical shoulder on its exterior surface and intermediate the front and rear edges thereof, said shoulders extending from the crown to the base of said unit, the shoulders on the right side of each unit facing toward one side of the bank and the shoulder on the left side of each unit facing toward the opposite side of the bank, the side walls fore and aft of said vertical shoulders being inclined inwardly of the unit toward the front rear edges, respectively, of the base, and the right and left shoulders of adjacent units being in face-to-face contact when said units are in adjacent, horizontal alinement to form the bank, the adjacent, inwardly-inclined side walls of adjacent units of the bank defining diverging spaces between said units fore and aft of said vertical shoulders for the reception of water-sealing material to enhance the water-tightness of the bank.

4. A bank as defined in claim 3, in which the crown of each unit is provided on its upper surface with a longitudinal groove extending between the sides of the unit, and in which the grooves are located in end-to-end, continuous and unbroken alinement when the units are in adjacent horizontal alinement to form the bank, said alined grooves adapted to receive a slab inserted therein for imparting additional effective height to the bank.

5. A bank as defined in claim 3, in which a space is left between two of the horizontally-alined units with the vertical shoulders on the opposed side walls of the spaced units facing toward the front of the bank, said space being closed by removable boards the ends of which engage the shoulders on the opposed side walls of the spaced units.

FREDERICK WILLIAM ROWBOTHAM.

REFERENCES CITED

The following references are of record in the file of this patent:

UNITED STATES PATENTS

| Number | Name | Date |
|---|---|---|
| 919,788 | Smith | Apr. 27, 1909 |
| 954,283 | Hawkes | Apr. 5, 1910 |
| 1,230,608 | Sheldon | June 19, 1917 |
| 1,004,828 | Tuthill | Oct. 3, 1917 |
| 1,610,341 | Wells | Dec. 14, 1926 |
| 1,993,217 | Mason | Mar. 5, 1935 |
| 2,014,116 | Powers | Sept. 10, 1935 |
| 2,069,715 | Arpin | Feb. 2, 1937 |

FOREIGN PATENTS

| Number | Country | Date |
|---|---|---|
| 40,911 | Netherlands | 1937 |